United States Patent [19]

Kato et al.

[11] Patent Number: 4,921,095

[45] Date of Patent: May 1, 1990

[54] CRATINGS FOR INSULATOR

[75] Inventors: Tsugiji Kato, Chiryu; Kunitoshi Aoyama, Komaki; Motokazu Kozakai, Kasugai, all of Japan

[73] Assignee: NGK Insulators, Ltd., Japan

[21] Appl. No.: 307,474

[22] Filed: Feb. 8, 1989

[30] Foreign Application Priority Data

Dec. 26, 1988 [JP] Japan ............................... 63-325965

[51] Int. Cl.$^5$ ............................................ B65D 81/02
[52] U.S. Cl. .................................. 206/328; 206/586; 206/587
[58] Field of Search ............... 206/328, 334, 386, 586, 206/587, 590, 593

[56] References Cited

U.S. PATENT DOCUMENTS

| | | | |
|---|---|---|---|
| 1,568,834 | 1/1926 | Hauge et al. | 206/587 |
| 2,256,995 | 9/1941 | Andres | 206/590 |
| 2,351,097 | 6/1944 | Boeringer | 206/334 |
| 2,525,673 | 10/1950 | Heinrich | 206/334 |
| 2,802,955 | 8/1957 | Kitterman | 206/334 |
| 3,333,685 | 8/1967 | Pezek | 206/334 |
| 4,303,157 | 12/1981 | Edwards | 206/590 |

Primary Examiner—David T. Fidei
Attorney, Agent, or Firm—Arnold, White & Durkee

[57] ABSTRACT

An insulator crating usable for the transportation of insulators and the like comprises plural plate-like members arranged at equal spaces around an insulator to be transported, at least two tying members for fixing these plate-like members to the periphery of the insulator, and at least one engaging member fitting between shade portions of the insulator or between insulators.

4 Claims, 3 Drawing Sheets

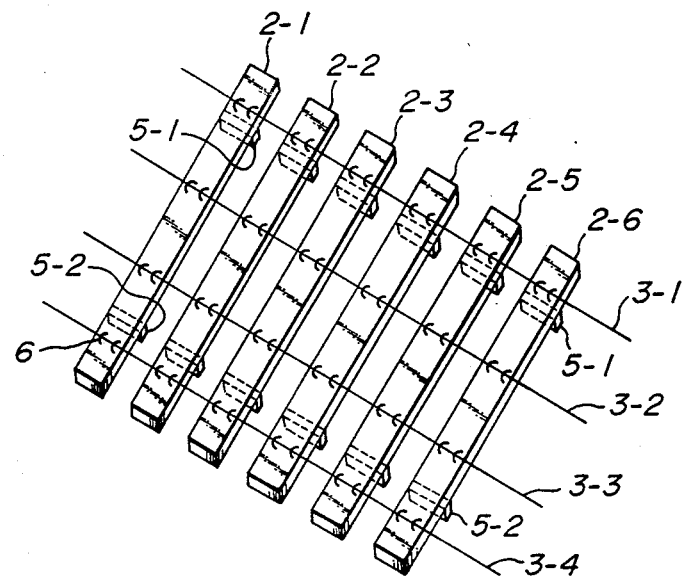
FIG_2

FIG_3
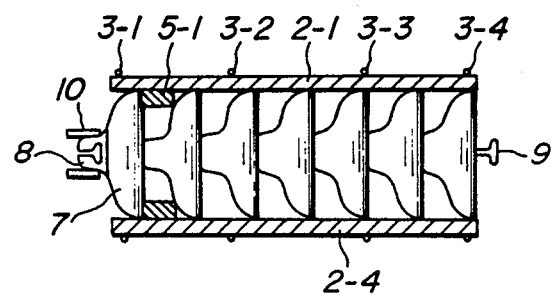
FIG_4
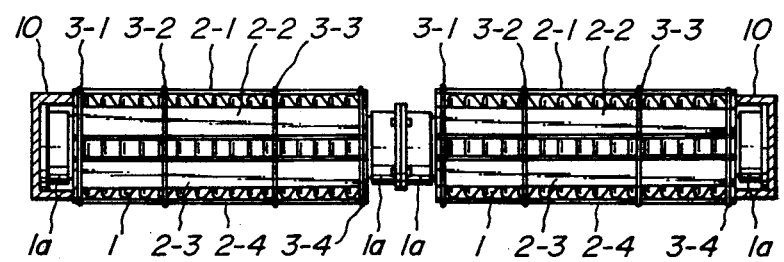

CRATINGS FOR INSULATOR

BACKGROUND OF THE INVENTION

1. Field of the Invention

This invention relates to an insulator crating which is suitable for transportation of various insulators and can conduct fixation on the spot, as they are and can easily be decrated after fixation, by minimizing the chance of damaging the insulators.

2. Related Art Statement

In the transportation of connecting-type suspension insulators, longrod insulators, various bushings or the like, as disclosed, for example, in Japanese Utility Model laid open No. 58-52145, the insulators have hitherto been transported by surrounding the entire insulator comprised of: an outer periphery of the insulator, the metal fitting thereof and the like, with, for example, timbers to form a small-unit insulator crating and then piling a plurality of such small unit insulator cartings upon one another.

In the conventional insulator crating as mentioned above, the insulator is protected by covering the entire insulator inclusive of the metal fitting, with the timber in box-like form in order to prevent damage of insulator during the transportation. Therefore, when the insulator is fixed on the spot after transportation, it is necessary to decrate the entire crating for taking the insulator off of the crating and conducting fixation of the insulator at a bare state.

For example, in order to fixate the insulator on a power transmission tower, transformer or the like for outdoor use, or to connect the insulator to another insulator or equipment, the crating is first decrated on the ground, and thereafter hung with a rope and transported to a given position. As a result, the insulator is apt to be damaged due to collision with the tower or other equipment and, in extreme cases, the insulator may be broken.

In order to prevent these problems, it is required to wind a previously provided protective member such as blanket, quilting or the like around the surface of the insulator before fixation of the insulator. In this case, attachment and detachment of the protective member require much labor.

Moreover, since conventional crating protects the insulator by covering the entire insulator with timbers or the like in box form, significant amount of labor is required for decrating.

SUMMARY OF THE INVENTION

It is, therefore, an object of the invention to solve the aforementioned problems of conventional techniques and to provide an insulator crating which can: completely protect the insulator during transportation, conduct fixation of the insulator at the crated state without exposing the fragile insulator and make decrating easier.

According to the invention, there is provision of an insulator crating comprising an insulator provided at each end portion with a metallic fitting, plural plate-like members each extending in the longitudinal direction of the insulator and arranged at equal spaced around the insulator in a hurdle form and at least two tying members for fixing the plate-like members to the insulator as well as tying these plate-like members from the advant, characterized in that said metallic fittings are exposed from said plate-like members to such an extent that one of said metallic fittings can be connected to another connecting portion and the provision that each of said plate-like members is provided inside with at least one engaging member fitting between adjoining shade portions among plural shade portions of the insulator or between adjoining insulators.

BRIEF DESCRIPTION OF THE DRAWINGS

The invention will be described with reference to the accompanying drawings, wherein:

FIG. 2 is a diagrammatic view showing plural plate-like members of hurdle structure before attachment to the insulator;

FIG. 3 is a partly diagrammatic sectional view of a second embodiment of the insulator crating according to the invention; and FIG. 4 is a front view of a third embodiment of the insulator crating according to the invention.

DESCRIPTION OF THE PREFERRED EMBODIMENTS

In the insulator crating according to the invention, the metallic fittings located at both ends of the insulator are exposed from the insulator crating to such an extent that one of these metallic fittings can be connected to a metallic fitting of an insulator in another insulator crating or a connecting portion of the tower or other equipment, so that a transmission line or the like can be attached to the insulator at the crated state without decrating the insulator crating in which no damage or breakage of the insulator during fixation of the insulator occurs. Furthermore, the plural plate-like members extending in a longitudinal direction of the insulator are fixed to the periphery of the insulator by tying members such as wire or the like, so that the insulator crating can be decrated in one touch by cutting the tying member or untying knots of the tying member. In the case of untying the knot, recrating can easily be conducted, if necessary. Moreover, at least one engaging member fitting between adjoining shade portions of the insulator or between adjoining insulators is arranged on the inside face of each plate-like member and is located between the adjoining suspension insulators or between the adjoining shade portions of the insulator during crating, whereby displacement of the plate-like member from the insulator can be prevented during transportation. Further, no breakage or the like of the insulator occurs during transportation, also, sliding of the plate-like members from the insulator can be prevented when the insulator crating is vertically positioned for fixation of the insulator.

Figure 1A:
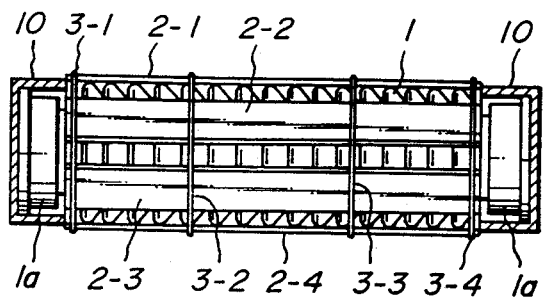
FIGS. 1a to 1c are the front view, sectional view and side view of a first embodiment of the insulator crating according to the invention, respectively.
Figure 1B:
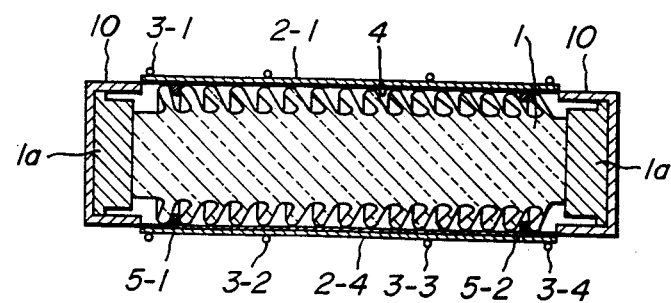
Figure 1C:
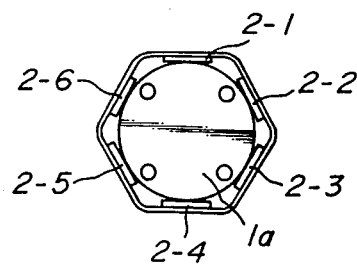

In FIGS. 1a to 1c is shown a first embodiment of the insulator crating according to the invention, wherein six plate-like members 2-1 to 2-6 made from, for example, timbers are arranged around a longrod insulator 1 and provided at both ends with metallic fittings 1a for connection and fastened by wires 3-1 to 3-4 as a tying member so as to protect the longrod insulator 1 with the plate-like members 2-1 to 2-6. Since the metallic fittings 1a, located at both end portions of the longrod insulator 1, are completely exposed, this insulator 1 can be easily connected to another insulator 1 without decrating or positioning in a state as shown in FIGS. 1a to 1c. As shown in FIG. 1b, two wooden engaging members 5-1 and 5-2, each fitting between adjoining shade portions of the insulator, are arranged at both end portions of each the plate-like member 2-1 to 2-6, and located between the adjoining shade portions of longrod insulator 1. After the insulator is set in place at the crated state, the decrating of such an insulator crating can be conducted in one step by cutting wires 3-1 to 3-4 or untying the knots thereof.

In the illustrated embodiment, a transparent vinyl sheet 4, having a thickness of 0.03–0.2 mm, is extended over a whole periphery of the longrod insulator 1 between each of the plate-like members 2-1 to 2-6 and insulator 1, whereby the porcelain portion in insulator 1 can be prevented from polluting. Further, each of the metallic fittings 1a is covered with a cover 10 made from, for example, corrugated fiberboard or the like for the protection of the metallic fitting. Moreover, FIG. 1c shows a side view of the insulator crating before metallic fitting 1a is covered with cover 10.

FIG. 2 shows a state before plate-like members 2-1 to 2-6, made of timbers, are attached to longrod insulator 1 in the formation of the insulator crating as shown in FIG. 1. In this case, the two wooden engaging members 5-1 and 5-2 are arranged at both end portions of each plate-like member 2-1 to 2-6, while wires 3-1 to 3-4 are fixed to each of the plate-like members 2-1 to 2-6 through plural staples 6. Size of the plate-like member is dependent upon the size of the insulator to be transported, but it is preferable that each of the plate-like members 2-1 to 2-6 has a thickness of 3–15 mm and a width of 40–70 mm. Further, the space between adjoining plate-like members is preferably within a range of 25–50 mm, and the total space among these plate-like members 2-1 to 2-6 is favorably not more than 30% of the whole periphery surrounding the insulator. On the other hand, a timber of 15–24 mm square is preferably used as each of the engaging members 5-1 and 5-2. Further, a galvanized wire of 1.0–3.0 mm in diameter is preferably used as each of the wires 3-1 to 3-4, and a metal staple of 0.5–2.0 mm in diameter is favorably used as staple 6.

FIGS. 3 and 4 show another embodiments of the insulator crating according to the invention, wherein the same member as in FIGS. 1a to 1c is represented by the same reference numeral.

In the embodiment of FIG. 3, the insulator to be protected is a connecting-type suspension insulator 7, instead of the longrod insulator 1. The insulator crating according to the invention can be comprised by fastening plate-like members 2-1 to 2-6, each provided with an engaging member 5-1 fitting between the adjoining suspension insulators 7, around the connected suspension insulators 7, through the wires 3-1 to 3-4. In this case, it is important that an uppermost cap 8 and lowermost pin 9 of the connected suspension insulators 7 are exposed from both ends of the plate-like members 2-1 to 2-6 at such a state that the cap 8 or pin 9 can be connected to a cap or pin of another insulator crating or the other connecting portion.

FIG. 4 shows a state of connecting two insulator cratings as shown in FIGS. 1a to 1c to each other. In order to connect the metallic fitting 1a of the longrod insulator 1 to a metallic fitting 1a of another longrod insulator 1 through bolts as shown in FIG. 4, since each of the plate-like members 2-1 to 2-6 is nonexistent in both end portions of the longrod insulator 1, containing the metallic fittings 1a, the covers 10 are taken off of the opposed metallic fittings 1a of the longrod insulators 1 in the two transported insulator cratings without decrating, for connecting these longrod insulators to each other.

It is apparent that many variations and modifications may be made without departing from the scope of the invention. For example, quantity of the plate-like members, wires and engaging members used are not limited to those of the aforementioned embodiments. Further, the metallic fitting of the insulator is not necessarily covered with the cover. Moreover, the crating according to the invention may be applied to various bushings, linepost insulators, stationpost insulators and the like, in addition to the above longrod and suspension insulators.

As mentioned above, in the insulator crating according to the invention, the plate-like members are fastened around the insulator through wires so as to expose the metallic fittings located at both end portions of the insulator from both ends of each of the plate-like members. At least one engaging member is arranged in each of the plate-like members, so that fixation of the insulator or the like can be conducted at the crated state without decrating. Damage or breakage of the insulator can be prevented during transportation and fixation. Also the decrating operation can be simplified. Further, the material used can be reduced by 30%, on average, as compared with the conventional wooden box system, whereby cost of the crating can be further reduced. Moreover, when a protective member such as a vinyl sheet or the like is arranged inside the plate-like members, the porcelain portion of the insulator can be prevented from polluting during transportation and storing. Consequently, washing the insulator can be omitted.

What is claimed is:

1. An insulator crating for an insulator having a metallic fitting provided at each end portion thereof, said crating comprising:
   a plurality of plate-like members arranged around an outer peripheral portion of said insulator in a radially spaced manner, each of said plate-like members having at least one engaging member provided on an inner surface thereof; and
   at least two tying members for fixing the plate-like members to the outer peripheral surface of said insulator;
   wherein the metallic fittings of said insulator are exposed from the plate-like members to such an extent that one of said metallic fittings can be connected to another metallic fitting of another insulator, and said at least one engaging member fits between adjacent shade portions among a plurality of shade portions of said insulator or between adjoining insulators.

2. An insulator crating according to claim 1, wherein said plate-like member has a thickness of 3–15 mm and a width of 40–70 mm.

3. An insulator crating according to claim 1, wherein said plate-like members are equally radially spaced by a distance of 25–50 mm and a total spacing among said plate-like members is not more than 30% of the whole periphery surrounding said insulator.

4. An insulator crating according to claim 1, wherein said tying member is a galvanized wire having a diameter of 1.0–3.0 mm and said engaging member is a timber of 15–24 mm square.

* * * * *